United States Patent Office 3,496,432
Patented Feb. 17, 1970

3,496,432
ELECTRIC CAPACITOR ENCLOSED IN AN ENVELOPE AND PROVIDED WITH A PROTECTOR BREAKABLE AT AN OVERHEATING OF THE CAPACITOR
Lennart Albert Mo, Vallingby, and Sven-Olof Lindström, Sundbyberg, Sweden, assignors to Telefonaktiebolaget L M Ericsson, Stockholm, Sweden, a corporation of Sweden
Filed Oct. 24, 1968, Ser. No. 770,346
Claims priority, application Sweden, Nov. 24, 1967, 16,152/67
Int. Cl. H01g 7/04; H02h 7/16
U.S. Cl. 317—247
2 Claims

ABSTRACT OF THE DISCLOSURE

A metallized capacitor is formed of a shrinkable dielectric with metal contact portions on the dielectric. When heat builds up during operation the dielectric of the capacitor will shrink causing the metal portions to break electrical contact.

---

The invention relates to an electric capacitor provided with a protector device. In electric capacitors and especially capacitors used for alternating current operation it happens that the capacitor is strongly overheated at occurring faults. The heat gives a formation of gas that might burst the envelope of the capacitor. In order to avoid this bursting of the envelope one provides the capacitor with a protector device usually consisting therein that one or both lead-in wires are stretched between the capacitor winding and the envelope, eventually the cover of the envelope, so that a deformation of the envelope respectively the cover causes a rupture of the wire, thus interrupting the current supply. Because the gas formation ceases with a certain delay, the wire has to be ruptured at a relatively early stage of the gas formation, so that there is a safe margin for further deformation of the envelope without bursting the same. In a known device folds are made in the envelope that are yieldable to tensions in the envelope. One presses together a crease, usually provided round the opening of the envelope to give a stopping flange on the inside of the envelope for a cover inserted in the opening. In another device the cover is pressed onto the crease by means of a hermetically closing packing on the outside of the cover, which packing is made of compressible material and has a dimension in the axial direction of the envelope sufficient to allow a displacement of the cover to break the lead-in wire at an overpressure caused by gas formation.

The invention gives a much more effective protection than that of the known devices, because it functions at overheating before formation of gas has appeared. It is used in wound capacitors that have a terminal contact at at least one gable end of the capacitor winding and is especially characterized by the capacitor winding being made of metallized plastic foil with the property of contracting in at least one contraction direction when heated, by the winding being made in such a manner that a contraction direction coincides with the axial direction of the winding, the envelope having a first anchoring means engaging said terminal contact at said at least one gable end to anchor the same to the envelope and a second anchoring means located axially distant from said one gable end to anchor a portion of the capacitor axially distant from said one gable end to the envelope, so that a reduction in length of the winding caused by heat interrupts the electrical contact between the winding and said terminal contact.

Figure 1:
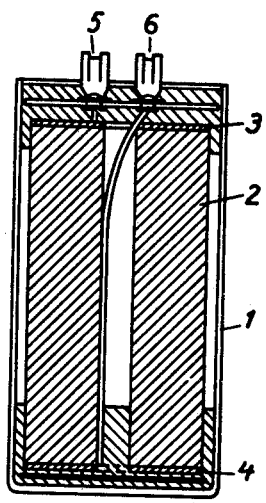
Figure 2:
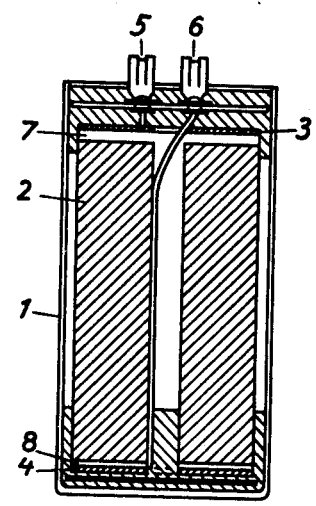

The invention will be further described by means of an embodiment with reference to the attached drawing, FIG. 1 and FIG. 2, that show a sectional view of a wound capacitor in operational condition respectively in interrupted condition after the protector device has functioned because of heating. In an envelope 1 is provided a capacitor winding 2, in the known way provided with terminal contacts in the form of metal layers 3 and 4 on the gable ends. The metal layers that by means of wires are connected to exterior soldering terminals 5 and 6 are by means of epoxy resin fixed to the envelope. The dielectric of the winding consists of a foil of thermoplastic material with the property of contracting when heated. During the manufacturing process of the winding steps are taken to have a contraction direction of the foil coincide with the axial direction of the winding. Thus, when the winding upon heating contracts in its axial direction at least one of the metal layers of a gable end is separated from the winding, so that the electrical connection to the capacitor winding is interrupted. Eventually both metal layers at the gable ends are separated from the winding as shown at 7, 8 in FIG. 2, an occurrence that is explained by the fact that epoxy resin is sticking only weakly to the thermoplastic material of the winding. The property of thermoplastic foils to contract specially in a defined direction ordinarily depends on the fact that during the manufacture the foil has been stretched out more in this direction than in other directions. A convenient material for use in capacitors with protector devices according to the invention is polypropylene. It is not necessary that the terminal contacts should be designed as metal layers on the gable ends of the winding, they may be made as metal pieces of arbitrary design that in a convenient way make contact to the metallized surfaces of the winding.

We claim:
1. Electric capacitor with protector device comprising a capacitor winding of metallized plastic foil with the property of contracting in at least one contraction direction when heated, a contraction direction of the foil extending parallelly to the axial direction of the capacitor winding, said capacitor winding having a terminal contact at at least one gable end, a first anchoring means engaging said terminal contact at said at least one gable end to anchor said terminal contact to the envelope, and a second anchoring means located axially distant from said one gable end to anchor a portion of the capacitor winding axially distant from said gable end to the envelope, so that a contraction of the winding in its axial direction caused by heat, interrupts the electrical contact between the winding and said terminal contact.

2. Capacitor according to claim 1 wherein the foil material is polypropylene.

References Cited

UNITED STATES PATENTS 3,294,941   12/1966   Mullen.

ELLIOT A. GOLDBERG, Primary Examiner

U.S. Cl. X.R.

317—12, 256; 337—1